| (12) | United States Patent | (10) Patent No.: | US 11,426,738 B2 |
|---|---|---|---|
| | Johns | (45) Date of Patent: | Aug. 30, 2022 |

(54) SWINGING BUCKET CENTRIFUGE WITH A BUCKET MOUNTED BY A CLEVIS PIN HELD IN A CLEVIS

(71) Applicant: Beckman Coulter, Inc., Brea, CA (US)

(72) Inventor: Charles W. Johns, Brownsburg, IN (US)

(73) Assignee: Beckman Coulter, Inc., Brea, CA (US)

( * ) Notice: Subject to any disclaimer, the term of this patent is extended or adjusted under 35 U.S.C. 154(b) by 337 days.

(21) Appl. No.: 16/478,939

(22) PCT Filed: Jan. 17, 2018

(86) PCT No.: PCT/IB2018/050281
§ 371 (c)(1),
(2) Date: Jul. 18, 2019

(87) PCT Pub. No.: WO2018/134741
PCT Pub. Date: Jul. 26, 2018

(65) Prior Publication Data
US 2020/0147622 A1    May 14, 2020

(30) Foreign Application Priority Data

Jan. 18, 2017 (EP) .................................... 17000084

(51) Int. Cl.
*B04B 5/04* (2006.01)
*B04B 13/00* (2006.01)
(Continued)

(52) U.S. Cl.
CPC ............ *B04B 5/0421* (2013.01); *B04B 13/00* (2013.01); *B04B 7/08* (2013.01);
(Continued)

(58) Field of Classification Search
CPC .......... B04B 5/0421; B04B 13/00; B04B 7/08; B04B 2005/0435; B04B 2011/046; G01N 2035/00495
(Continued)

(56) References Cited

U.S. PATENT DOCUMENTS

| 1,334,109 A | * | 3/1920 | Mojonnier | ............ B04B 5/0421 494/20 |
| 4,030,663 A | * | 6/1977 | Conn | .................... B04B 5/0421 494/20 |

(Continued)

FOREIGN PATENT DOCUMENTS

| EP | 3351307 A1 | 7/2018 |
| JP | H06285390 | 10/1994 |

(Continued)

OTHER PUBLICATIONS

"European Application Serial No. 17000084.8, Extended European Search Report dated Jul. 19, 2017", 6 pgs.

(Continued)

*Primary Examiner* — Walter D. Griffin
*Assistant Examiner* — Shuyi S. Liu
(74) *Attorney, Agent, or Firm* — Schwegman Lundberg & Woessner, P.A.

(57) ABSTRACT

A swinging bucket centrifuge (1) comprises a rotor (10) with at least one mounting end and at least one bucket (20) mounted to the at least one mounting end of the rotor (10). Therein, the at least one bucket (20) is mounted to the at least one mounting end of the rotor (10) by at least one clevis pin (30) held in a clevis (13) so that the bucket (20) is pivotable about the clevis pin (30).

20 Claims, 5 Drawing Sheets

Figure 1:
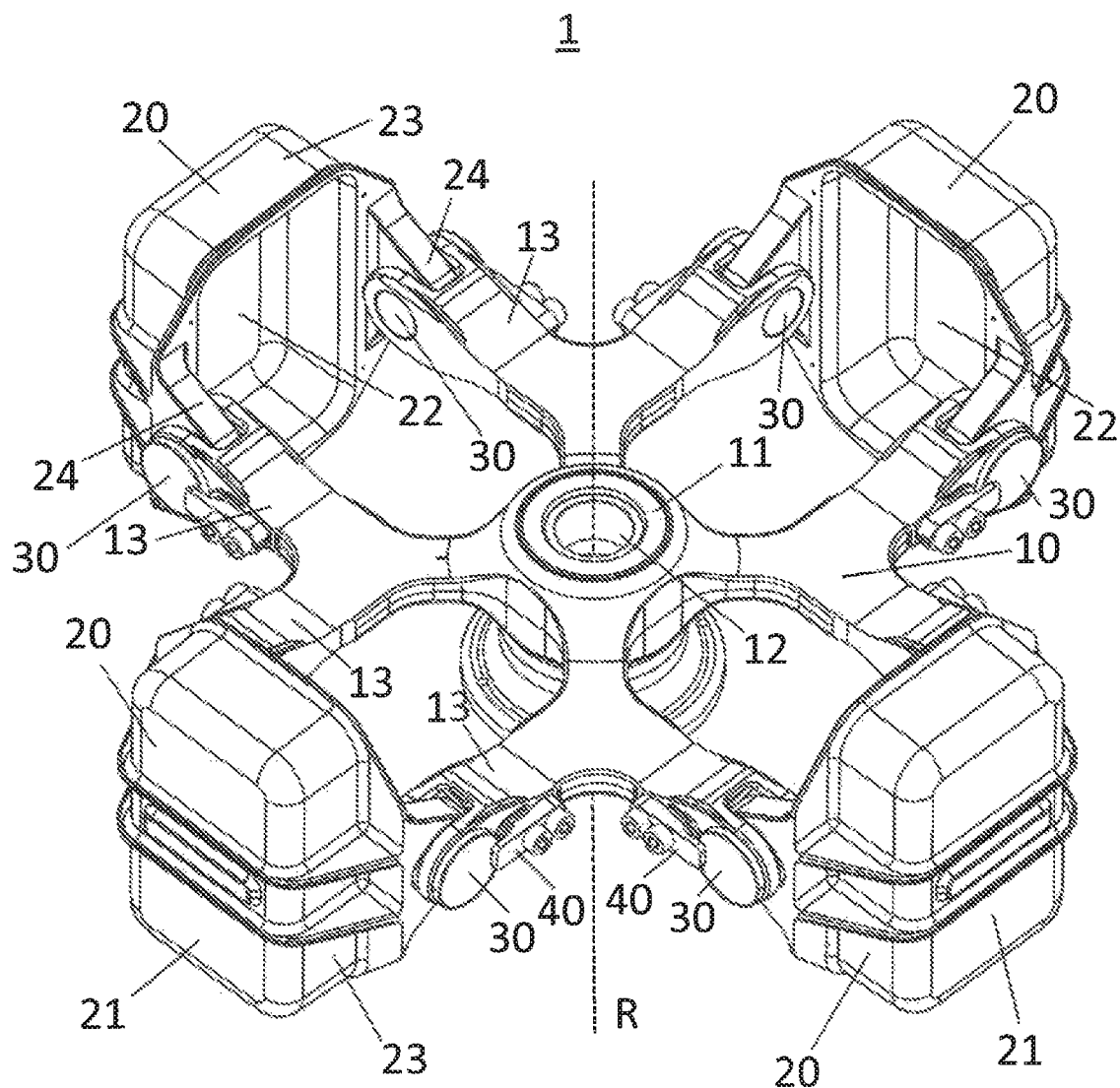

(51) Int. Cl.
B04B 7/08 (2006.01)
B04B 11/04 (2006.01)
G01N 35/00 (2006.01)

(52) U.S. Cl.
CPC . *B04B 2005/0435* (2013.01); *B04B 2011/046* (2013.01); *G01N 2035/00495* (2013.01)

(58) Field of Classification Search
USPC ...................................................... 494/16, 20
See application file for complete search history.

(56) References Cited

U.S. PATENT DOCUMENTS

| | | | | |
|---|---|---|---|---|
| 4,141,489 | A | * | 2/1979 | Wright .................. B04B 5/0421 494/20 |
| 4,314,662 | A | | 2/1982 | Uchida |
| 5,851,170 | A | * | 12/1998 | Howell ................. B04B 5/0421 494/20 |
| 2003/0185710 | A1 | * | 10/2003 | Matsuda ............... B04B 5/0421 422/72 |
| 2007/0234511 | A1 | * | 10/2007 | Rutledge ................... B64C 1/14 16/82 |
| 2012/0010654 | A1 | * | 1/2012 | Staggs ............... A61B 17/2812 606/213 |
| 2019/0285112 | A1 | * | 9/2019 | Moffat ....................... A47F 8/00 |

FOREIGN PATENT DOCUMENTS

| | | |
|---|---|---|
| JP | H0857352 | 3/1996 |
| JP | H0924300 | 1/1997 |
| JP | H09155235 | 6/1997 |
| JP | H112231 | 1/1999 |
| JP | 2006160311 | 6/2006 |
| JP | 3137462 | 10/2007 |
| JP | 2010506109 | 2/2010 |
| JP | 2015528549 | 9/2015 |
| JP | 2020504006 A | 2/2020 |
| WO | WO-2018134741 A1 | 7/2018 |

OTHER PUBLICATIONS

"European Application Serial No. 17000084.8, Response filed Jan. 8, 2018 to Extended European Search Report dated Jul. 19, 2017", 16 pgs.

"International Application Serial No. PCT/IB2018/050281, International Search Report dated Apr. 19, 2018", 3 pgs.

"International Application Serial No. PCT/IB2018/050281, Written Opinion dated Apr. 19, 2018", 5 pgs.

"Japanese Application Serial No. 2019-538408, Notification of Reasons for Refusal dated Dec. 14, 2021", with English translation, 9 pgs.

"Japanese Application Serial No. 2019-538408, Response filed Feb. 25, 2022 to Notification of Reasons for Refusal dated Dec. 14, 2021", with English claims, 13 pages.

* cited by examiner

SWINGING BUCKET CENTRIFUGE WITH A BUCKET MOUNTED BY A CLEVIS PIN HELD IN A CLEVIS

CROSS-REFERENCE TO RELATED APPLICATION

This application is a U.S. National Stage Filing under 35 U.S.C. 371 from International Application No. PCT/IB2018/050281, filed on Jan. 17, 2018, and published as WO 2018/134741 A1 on Jul. 26, 2018, which claims priority to European Patent Application No. 17000084.8, filed on Jan. 18, 2017 which applications are incorporated herein by reference in their entirety.

The invention relates to a swinging bucket centrifuge and a method of providing a swinging bucket centrifuge.

A centrifuge is a piece of equipment that puts an object in rotation for separating one or several substances. A centrifuge may include a rotor and one or a plurality of buckets hanging from the rotor. When the rotor accelerates from a resting position, the bucket starts rotating with respect to the rotor as centrifugal forces experienced by the bucket increase. The centrifugal forces cause the bucket to swing up out of its hanging position and in a rotating, operating position of the centrifuge.

These so-called swinging bucket centrifuges may require a lubricated pivot joint for the buckets to swing up equally and fully. If the bucket does not swing up equally, an imbalance may occur that may prevent the operation of the centrifuge. Furthermore, if the buckets do not swing up fully, sedimentation layers within the bucket may be arranged at an angle relative to the bottom of the bucket. Thus, the sedimentation layers may not be sampled properly by automated analyzers.

Therefore, lubricants are usually applied regularly and frequently to improve the swing-up movement of the buckets. However, these lubricants are often expelled from the centrifuge by the centrifugal forces. Thus, the lubricants have to be reapplied regularly. The expelled lubricant accumulates on the surface of the centrifuge's bowl and requires a regular cleaning. Therefore, the operator performs maintenance daily or every couple of days to apply lubricant and to clean the centrifuge.

A problem relates to providing a centrifuge which enables reducing the required maintenance time.

This problem is solved by the subject matter of the independent claims. Preferred embodiments are the subject matter of the dependent claims.

An aspect relates to a swinging bucket centrifuge comprising a rotor with at least one mounting end and at least one bucket mounted to the at least one mounting end of the rotor. Therein, the at least one bucket is mounted to the at least one mounting end of the rotor by at least one clevis pin held in a clevis so that the bucket is pivotable about the clevis pin.

The swinging buckets centrifuge may comprise the at least one bucket and/or a plurality of buckets. In particular, the swinging bucket centrifuge may comprise an even number of buckets that are mounted to and/or arranged at the rotor so that the rotor may accelerate each of the buckets to a rotating motion about an axis of rotation of the rotor.

The at least one bucket is provided as a swinging bucket. Thus, the at least one bucket is hanging from the at least one mounting end of the rotor when the centrifuge is resting. In this hanging position of the bucket, the at least one bucket may easily be loaded by a sample and/or a substance while the centrifuge is not running. After the rotor accelerates out of this resting position, centrifugal forces are applied to the at least one bucket so that the at least one bucket swings out of its hanging resting position and into an operating position wherein the bottom of the bucket may be arranged in a plane that is substantially parallel to the axis of rotation of the rotor. For example, the axis of rotation may be arranged substantially vertically in the reference system of the earth. In the resting position, the bottom of the at least one bucket may be arranged in a substantially horizontal plane. In the operating position of the centrifuge, wherein the rotor is rotating about the substantially vertically aligned axis of rotation, the bottom of the at least one bucket is arranged substantially vertically so that the opening of the bucket faces the axis of rotation of the rotor.

By rotating the buckets about the axis of rotation of the rotor, one or several substances within the at least one bucket may be separated by the centrifugal forces.

The rotor may be driven by a motor and/or may comprise a motor for providing the required power. The rotor may also be provided as part of an electric motor, e.g. the rotor of the electric motor. The rotor may comprise a mounting section which is mounted at the axis of rotation of the rotor. Spaced apart from this mounting section of the rotor, the rotor comprises the at least one mounting end. The rotor may comprise at least one rotor arm that connects the mounting section of the rotor to the mounting end of the rotor. The rotor may also comprise a plurality of mounting ends, e.g., two or four rotor arms that connect the mounting section of the rotor with respective mounting ends of the rotor. Each mounting end may be provided and arranged for mounting one bucket each. The rotor may be provided as a yoke to mount the at least one bucket to.

The at least one bucket is mounted to the at least one mounting end of the rotor such that it may swing between at least two positions. In a resting position of the centrifuge, the at least one bucket substantially hangs from the mounting end of the rotor so that it can easily be loaded with a substance and/or a sample that is supposed to be investigated in the centrifuge. In an operating position of the centrifuge, the rotor rotates about its axis of rotation. In this operating position of the centrifuge, the at least one bucket is in a different position in which it is swung-up out of its hanging, resting position. In this swung-up position of the bucket, the bucket may substantially be arranged as an extension of the mounting end of the rotor. The transition from the hanging position to the swung-up position of the bucket is driven by centrifugal forces originating from the rotating motion of the rotor. A transition from the swung-up position of the bucket (in the operating position of the centrifuge) into its hanging position (in the resting position of the centrifuge) may be driven by gravitation.

For enabling the swinging-up and/or the swinging-down movement of the bucket, the bucket is mounted to the mounting end of the rotor in a pivotable manner. The corresponding pivot axis substantially corresponds to the arrangement of the clevis pin. The bucket is arranged at the mounting end of the rotor in a clevis joint. In other words, either the mounting end and/or a section of the bucket is provided as a clevis comprising, e.g., at least two clevis arms that allow accommodation of an engaging element that is fixed to the clevis by the clevis pin.

For example, the mounting end of the rotor may be provided as a clevis with at least two clevis arms. A section of the bucket, e.g. an engaging element of the bucket, may be arranged between the at least two clevis arms of the mounting end and fixed there by the clevis pin. The clevis pin may penetrate the at least two clevis arms and, in between, the engaging element at least partially. The clevis pin may be provided as a bolt and/or a stud extending along the pivot axis of the bucket. The clevis pin may comprise a predetermined outer diameter in a radial direction from the pivot axis. Said outer diameter of the clevis pin may be substantially constant along at least a section of the clevis pin about which the bucket is pivotably mounted. Thus, the bucket may pivot about the clevis pin that is held at its two ends by the at least two clevis arms. Therein, the load and/or the stress of the centrifugal forces may be evenly distributed to the two ends of the clevis pin. This may increase the durability of the swinging bucket centrifuge by reducing unevenly distributed loads at the mounting of the buckets.

In previously known swinging bucket centrifuges, the buckets were arranged at the rotor in a one sided cantilever design. This one sided cantilever design promotes uneven loading and creates higher strain and, thus, may lead to an increased friction and a lower service life that requires more maintenance than the swinging bucket centrifuge wherein the at least one bucket is mounted to the rotor in the clevis joint design.

Thus, the swinging bucket centrifuge with a clevis joint design may lower unwanted friction and/or may reduce the required maintenance.

According to an embodiment, an engaging element comprising a through-hole is arranged between two clevis arms of the clevis. Each of said two clevis arms also comprises a through-hole. The clevis pin is arranged at least partially within the two through-holes of the two clevis arms and, in between, within the through-hole of the engaging element. Thus, the engaging element of the bucket or the mounting end of the rotor is held within the clevis by the clevis pin pivotally fixing the bucket to the mounting end. Thus, the clevis pin is held at two opposite ends of the engaging element in a secure and safe manner. This mounting increases the stability of the pivotable mounting of the at least one bucket.

According to a further development of the embodiment, the through-hole of the bucket in which the clevis pin is arranged comprises an elongated cross-section. The through-hole of the bucket may either be the through-hole of the engaging element or the at least two through-holes of the clevis arms. In other words, the through-hole of the bucket may be provided as a slot. The elongated cross-section of the hole may reduce the weight of the bucket and, thus, may further reduce the strain caused by the centrifugal forces at the clevis pin. Furthermore, the elongated cross-section may enable a lifting of the bucket, in particular during a leveling operation. Such a leveling operation may be used when unloading the bucket.

According to an embodiment, the clevis is part of the mounting end of the rotor and the bucket comprises an engaging element arranged between two clevis arms of the clevis. The outer dimensions of the engaging element may be dimensioned complementary to the inner dimension of the clevis. Thus, the bucket may be arranged within the clevis arms of the mounting end at a predetermined clearance and/or without clearance. The engaging element may be provided with a through-hole for the clevis pin. Besides the through-hole, the engaging element may be provided as a substantially solid element of the bucket.

According to an alternative embodiment, a mounting end of the rotor comprises an engaging element arranged between two clevis arms of the clevis which is part of the bucket. Said engaging element may be provided similar to the engaging element of the previous embodiment.

In an embodiment, the swinging bucket centrifuge comprises at least one bucket that comprises an engaging element to be arranged between two arms of the clevis provided by the rotor, and at least one bucket comprising two clevis arms for accommodating an engaging element of the rotor. In this embodiment, the swinging bucket centrifuge comprises different kinds of buckets, wherein some buckets comprise a clevis and some comprise an engaging element for a clevis. All buckets may be arranged at the rotor in clevis joints.

According to an embodiment, at least two buckets are arranged at, with respect to an axis of rotation, opposite ends of the rotor, wherein each bucket is mounted to one mounting end of the rotor by at least one clevis pin held in a clevis so that each bucket is pivotable about the respective clevis pin. By arranging the at least two buckets at the opposite ends of the rotor, a symmetry may be established that increases an even distribution of the load during the rotation of the centrifuge. The rotor may be shaped substantially linear with the axis of rotation separating the substantially linear rotor evenly. Alternatively, the rotor may be substantially shaped like a cross holding four buckets, one at each evenly long arm of the cross. In other embodiments, the rotor of the centrifuge may comprise a different shape allowing the mounting of an even number of buckets. Therein, pairs of buckets may be arranged at opposite ends of the rotor.

According to an embodiment, the clevis pin is held in its operating position by a retainer. Generally, the clevis pin may be removable for exchanging the bucket and/or the clevis pin. The clevis pin may also comprise one end comprising a larger diameter that is not able to enter the through-holes of the clevis arms. Said end may be provided as a pin head. However, at the opposite end, the pin usually comprises an outer diameter that enables removal of the clevis pin through the through-holes. Said end may be provided as pin tip. The retainer may be provided and arranged so that it prevents removal of the clevis pin. For example, the retainer may be arranged at the pin head so that it prevents removal of the clevis pin in a direction pointing from the pin tip to the pin head.

According to an embodiment, the clevis pin is implemented as a sex bolt pin. The sex bolt pin comprises two ends at opposite ends of the pin that prevent these ends from entering the through-holes of the clevis arms. Thus, the clevis pin is safely and securely held in its predetermined position.

According to an embodiment, one of the following is provided from Nitronic 60 material and the other one is provided from 17-4PH type stainless steel:
  the clevis pin;
  the clevis and/or an engaging element arranged between
    clevis arms of the clevis.

For example, the clevis pin may be provided from Nitronic 60 material moving within a through-hole of the engaging element and/or within through-holes in the clevis arms that may be provided from 17-4PH. Furthermore, also a retainer may be provided from one of said materials. Experimental data show that these materials may enable sufficient swing-up angles for the buckets and may provide a wear life of at least 200 000 cycles without requiring any lubrication.

The Nitronic 60 material is an austenitic stainless steel known for its wear and galling resistance. It may also provide a reasonably low coefficient of friction when mated with a 17-4PH type stainless steel. Other materials and surface treatments may not provide sufficiently low friction.

The elements of the swinging bucket centrifuge identified above may be provided as investment cast, in particular as a cast version of 17-4 PH, ASTM A747 CB7-Cu1.

According to an embodiment, the mounting end of the rotor and a mounting portion of the bucket are arranged and provided so that an opening into the inside of the bucket is unblocked. This may enable comfortable loading and/or unloading of the bucket with the sample, in particular in the resting position of the swinging bucket centrifuge. In the resting position, the opening may be arranged as an upper opening into a receiving section of the bucket.

According to an embodiment, the at least one bucket is pivotable about the clevis pin between a resting position and an operational position. Therein, an abutting side of the bucket abuts a resting side of the rotor and the resting position. Generally, the resting position of the bucket may correspond to a hanging position of the bucket while the swinging bucket centrifuge does not rotate. The abutting side and the resting side may be used to define the resting position of the bucket in the resting position of the centrifuge. The abutting side and the resting side may be arranged at a predetermined angle that defines the resting position of the bucket. In particular, they may be arranged so that the bottom of the bucket is arranged substantially horizontally with the opening of the bucket facing upwards. Thus, the bucket may be loaded with the sample in the resting position of the centrifuge.

According to an embodiment, the at least one bucket is pivotable about the clevis pin between a resting position and an operational position. Therein, a swing-up angle from the resting position to the operational position is at least 80°. Said swing-up angle may increase the wear life of the buckets at the centrifuge. Preferably, the swing-up angle may be from about 85 degrees to about 90 degrees. Thus, both an advantageous resting position and an advantageous operational position of the bucket may be provided.

According to an embodiment, the bucket is mounted to the mounting end of the rotor by two clevis pins, each clevis pin held in the clevis. Therein, the two clevis pins are aligned along a pivot axis of the bucket. Herein, the clevis comprises three arms and the engaging element comprises two engaging sections that are arranged in the space between the three clevis arms of the clevis. The two clevis pins between the three arms of the clevis may be provided as a single clevis pin protruding from a first outer clevis arm through a first engaging section of the engaging element, from there through a middle clevis arm of the clevis, then through a second engaging section of the engaging element and, finally, through the second outer clevis arm at the opposite end of the clevis. Alternatively, a clevis mounting with more than three clevis arms may be provided. However, more than three clevis arms may not provide further stability that would justify the complexity of the mounting and/or the maintenance and/or the assembly of such clevis mountings.

According to an embodiment, the rotor is adapted to apply an acceleration of 4000G. Therein, the G stands for the gravitational constant. In other words, during operation of the centrifuge, 4000G may be applied to the sample in the bucket to separate it into its components. The components of the centrifuge are provided in an according stability to enable this functionality. This high acceleration may be enabled by the clevis mounting and/or the materials of the elements of the centrifuge.

According to an embodiment, the clevis pin, the clevis, and/or and engaging element arranged between clevis arms of the clevis are provided in a material that allows operation of the centrifuge without requiring lubrication. This may, e.g. be achieved by the materials identified above (Nitronic 60 and 17-4PH). Thus, the centrifuge may be operated without lubrication. This enables reducing the maintenance efforts for the swinging bucket centrifuge.

According to an aspect, a method of providing a swinging bucket centrifuge comprises the steps of:
providing a rotor comprising at least one mounting end and
mounting at least one bucket to the at least one mounting end of the rotor, wherein the at least one bucket is mounted to the at least one mounting end of the rotor by at least one clevis pin held in a clevis so that the bucket is pivotable about the clevis pin.

The method may be used to provide the swinging bucket centrifuge according to the first aspect. Therefore, all remarks regarding the swinging bucket centrifuge according to the first aspect also relate to the method and vice versa.

Herein, the terms upper, lower, below, above, etc. refer to the reference system of the Earth in a mounting position of the subject-matter.

The numbers and/or angles given in the claims and the description are not limited to the exact numbers and/or angles, but may include measurement inaccuracies within limits that still enable solving the underlying problem.

Figure 2:
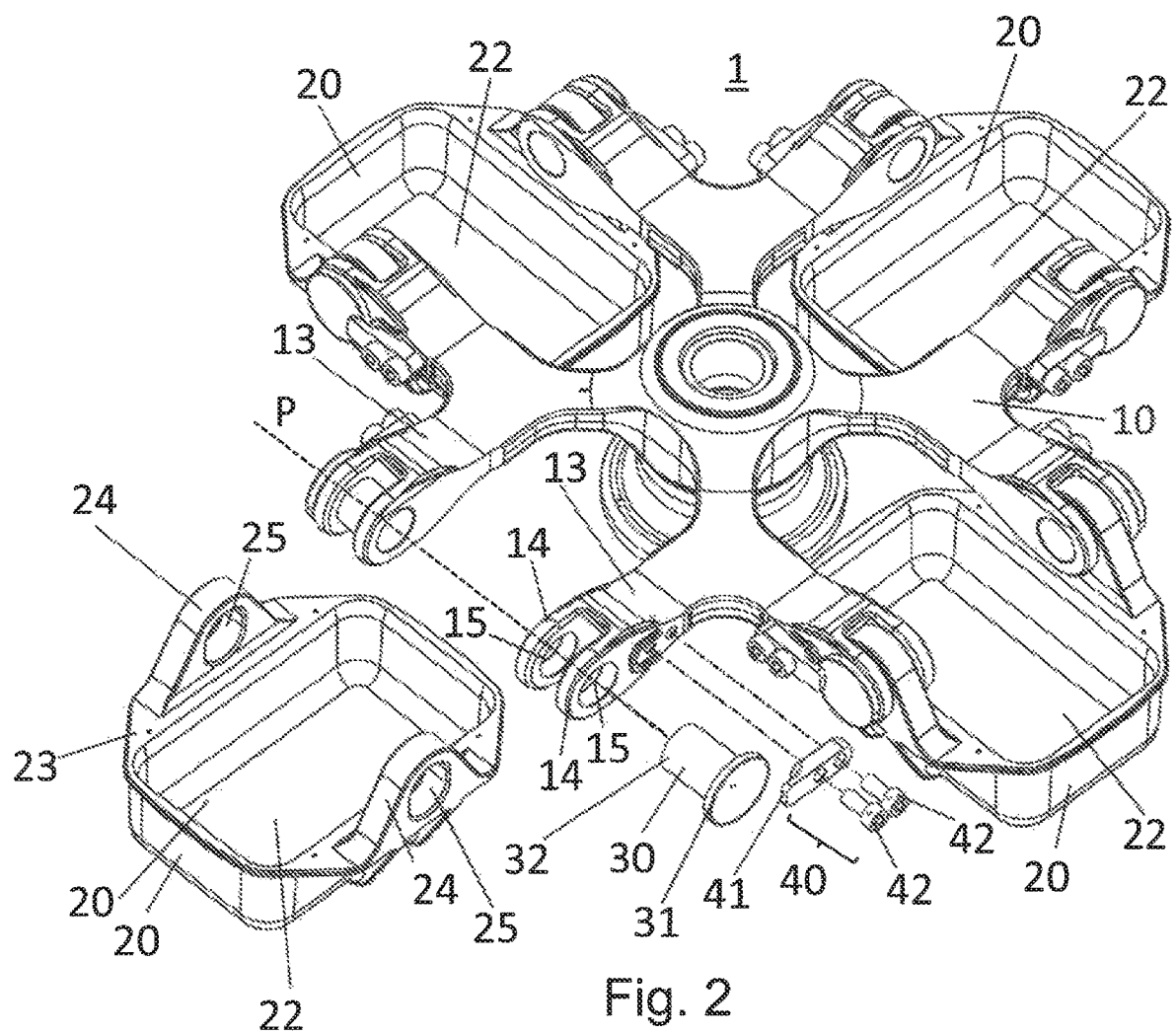
Figure 3:
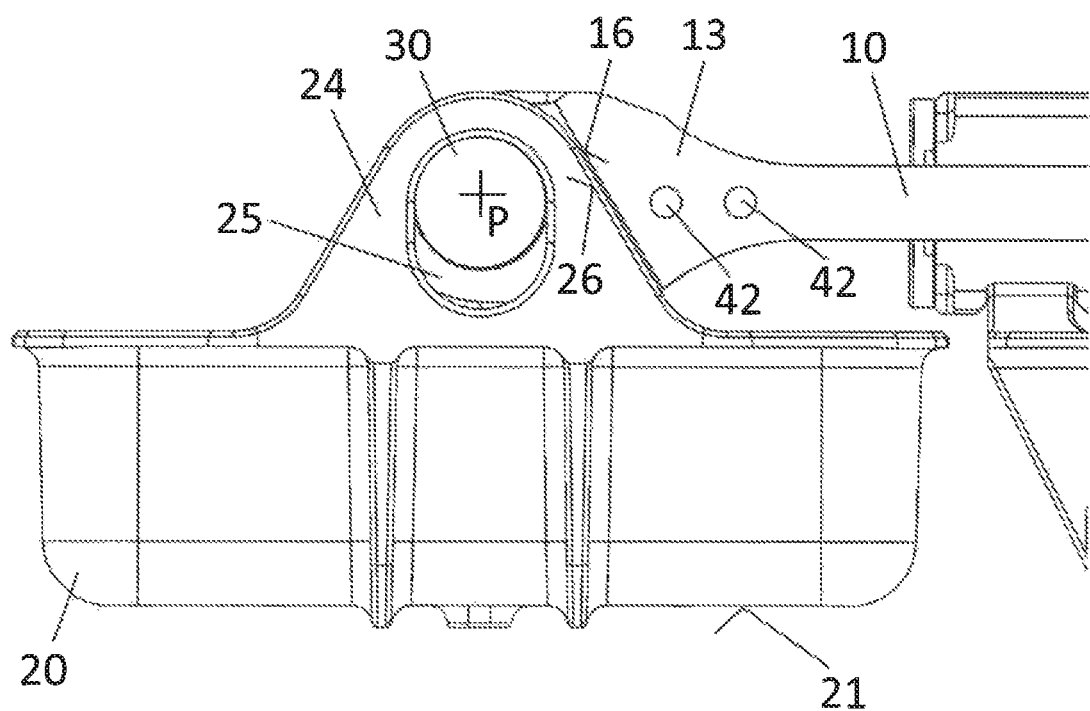
Figures 4A, 4B:
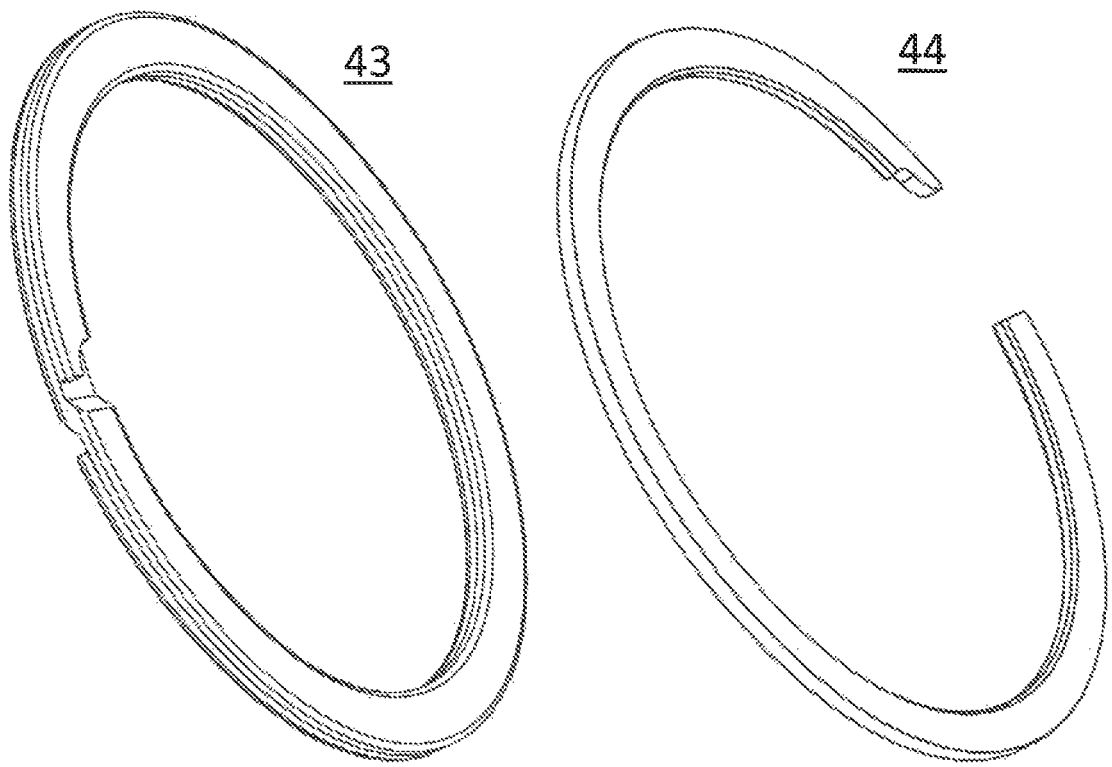

The invention is further illustrated in reference to embodiments shown in the figures. Embodiments of the invention are described with reference to the figures. Features of the embodiments shown in the figures may be combined with alternative embodiments. Identical reference numbers may identify identical or similar features of the embodiments. The embodiments as shown by:

FIG. 1 a perspective view of a swinging bucket centrifuge comprising four buckets in operating position;

FIG. 2 a perspective view of a swinging bucket centrifuge in a resting position, wherein one bucket is not yet assembled;

FIG. 3 a cross section through a clevis mounting of a bucket of the swinging bucket centrifuge in a resting position;

FIG. 4A a perspective view of a retainer ring;

FIG. 4B a perspective view of a retainer ring; and

Figure 5:
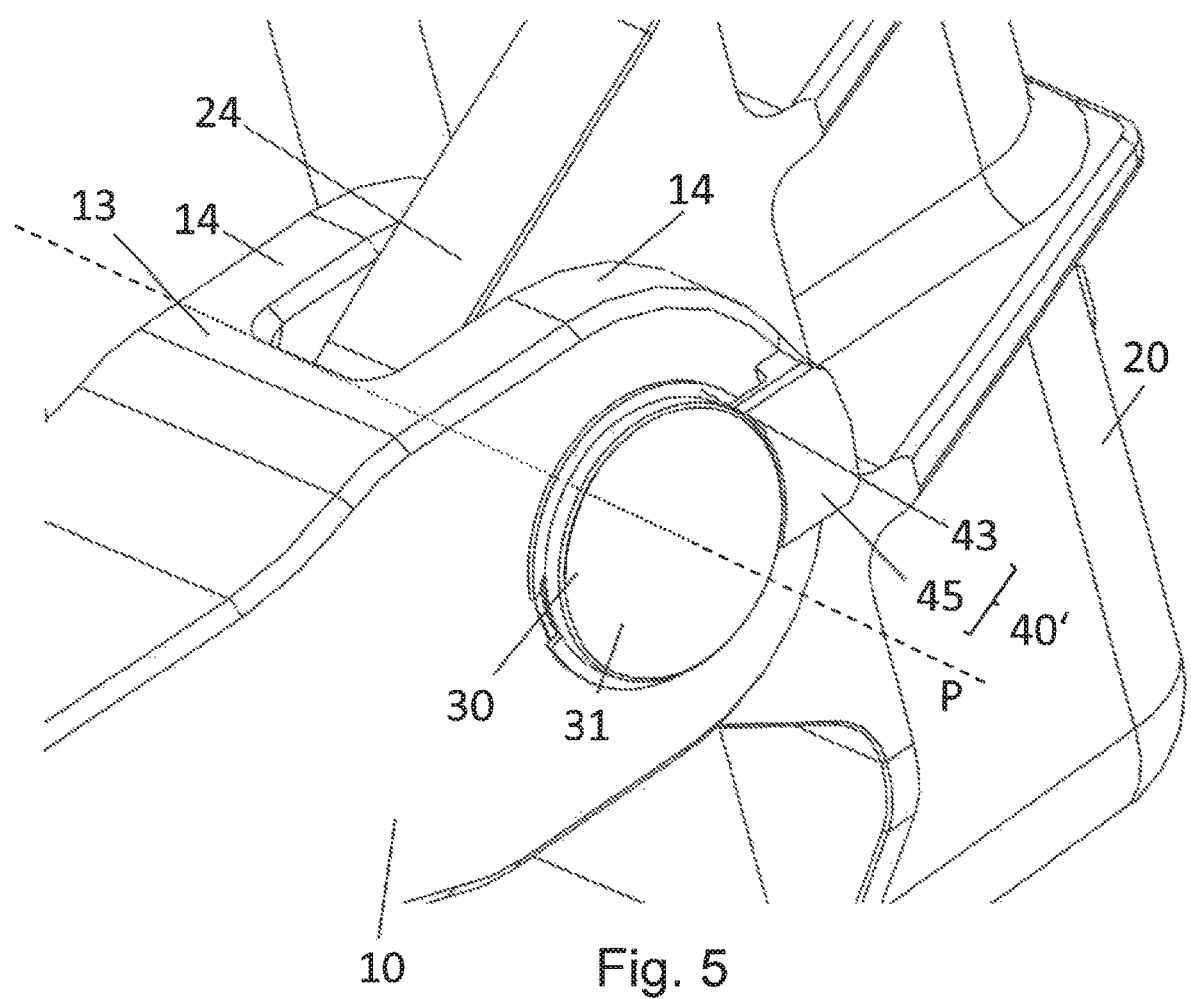

FIG. 5 a perspective view of a detail of a retainer of a swinging bucket centrifuge in an operating position.

FIG. 1 shows a perspective view of a swinging bucket centrifuge 1 comprising four buckets 20 in an operating position. In said operating position, the swinging bucket centrifuge 1 rotates about its axis of rotation R indicated by a dashed line in FIG. 1. This causes the buckets 20 to be arranged in a swung-up position caused by centrifugal forces.

The swinging bucket centrifuge 1 comprises a rotor 10. The rotor 10 comprises a center 11 arranged at and/or around the axis of rotation R. The center 11 is provided as a mounting section of the rotor 10. In the embodiment of FIG. 1, the center 11 comprises a center hole 12. The center hole 12 may accommodate a drive shaft of a motor driving the rotor 10. The axis of rotation R is arranged substantially vertically. Accordingly, also the center hole 12 is arranged so that it extents parallel to the axis of rotation R in a substantially vertical direction.

The rotor 10 enables mounting the buckets 20 at the swinging bucket centrifuge 1. For each bucket 20, the rotor 10 comprises a mounting end for each of the four buckets 20. Said mounting ends enable mounting the buckets 20 to the rotor 10. In the shown embodiment each mounting end comprises two clevis joints. At each clevis joint of the rotor 10, the rotor comprises a clevis 13. In other words, the rotor 10 comprises eight clevises 13, only four of which are identified by reference signs in FIG. 1. Each clevis 13 accommodates an engaging element 24 of the buckets 20. Each bucket 20 comprises two engaging elements 24 that enable mounting the bucket to the rotor 10. The two engaging elements 24 are held in two clevises 13 of the rotor 10.

In other words, the rotor comprises four mounting ends implemented as docking stations for one bucket 20 each. Each of the docking stations and/or mounting ends comprises two clevises 13 facing substantially outward in a horizontal direction away from the axis of rotation R. Each clevis 13 comprises two clevis arms. The four clevis arms of each mounting end of the rotor 10 are arranged substantially parallel to each other. In other words, the two clevises 13 of one mounting end of the rotor 10 are aligned so that they point in the same direction away from the axis of rotation R.

In the swinging bucket centrifuge 1, two buckets 20 are arranged in pairs at opposite ends of the rotor 10 with respect to the axis of rotation R. The swinging bucket centrifuge 1 comprises two such pairs of buckets 20. This promotes an even distribution of the weight load. Thus, the two devises 13 of a first mounting end face in exactly the opposite direction than the two clevises 13 of the opposite mounting end.

At each clevis 13, the corresponding engaging element 24 is held within the respective clevis 13 by a clevis pin 30. The clevis pin 30 establishes a pivot axis for each bucket 20. The two clevis pins 30 of each mounting end for a single bucket 20 are arranged within the same pivot axis. Thus, each bucket 20 is pivotably mounted to the respective mounting end of the rotor 10 by two clevis pins 30 arranged so that each clevis pin 30 protrudes through one of the clevises 13 and through one of the engaging elements 24 at two opposite sides of each bucket 20.

Each bucket 20 comprises a bottom 21 and a receiving section 22. Samples may be arranged within the receiving section 22. The sample may be provided as a fluid. The sample may further be arranged within tubes that are arranged within the receiving section 22 of the bucket 20. The tubes may be arranged within a tube rack that holds the tubes in an upright position when loading the buckets 20. The shape of the tube rack may correspond to the inner shape of the receiving section 22 (e.g., substantially rectangular).

The receiving section 22 is surrounded and/or defined by walls 23. The walls 23 are arranged at all lateral ends of the bottom 21 and extend from the bottom 21 to an upper rim of the bucket 20. Said upper rim of the bucket 20 faces towards the axis of rotation R in the operating position of the swinging bucket centrifuge 1 shown in FIG. 1.

The clevis pins 30 are held in position by an retainer 40 each. The mounting of the buckets 20 to the rotor 10 is described in further detail with reference to the following figures.

FIG. 2 shows a perspective view of the swinging bucket centrifuge 1 in a resting position. Therein, one bucket 20 is not yet assembled to the rotor 10 of the swinging bucket centrifuge 1.

In the resting position of the swinging bucket centrifuge 1, the rotor 1 does not rotate about the rotation axis R as shown in FIG. 1. In this resting position of the swinging bucket centrifuge 1, the buckets 20 hang from the clevises 13 of the rotor 10 so that the bottoms 21 of the buckets 20 are substantially aligned horizontally. In this resting position of the swinging bucket centrifuge 1, the buckets 20 are arranged in their hanging position. In this hanging position, free access is provided from above into the receiving sections 22 of the respective buckets 20. Thus, the hanging position of the buckets allows an easy and simply loading and/or unloading of the buckets 20.

In FIG. 2, the bucket 20 in the left lower corner of FIG. 2 is not yet fixed to the rotor of the swinging bucket centrifuge 1. As shown in FIG. 2, the bucket 20 may comprise a substantially rectangular base which is provided by the bottom 21 of the bucket 20. The walls 23 surround the receiving section 22 of the bucket 20 laterally. At the upper rim of the walls 23, engaging elements 24 extend beyond the rest of the upper rim of the walls 23. The engaging elements 24 are provided as protrusions extending beyond the walls 23 in a direction facing away from the bottom 21. The engaging elements 24 are arranged substantially in the middle of the section of the wall 23 they are provided at.

Each engaging element 24 comprises a bucket hole 25 provided as a through-hole through the engaging element 24. The two bucket holes 25 of each bucket 20 are aligned so that their axes substantially correspond to each other. Furthermore, the axes of the bucket holes 25 may be arranged at an axis of gravity of the respective bucket 20 that allows steady hanging from the clevis pin 30.

The clevis pin 30 comprises a clevis head 31 and clevis tip 32. The clevis head 31 is arranged at one end of the clevis pin 30 and the clevis tip 32 is arranged at the opposite end of the clevis pin 30. The pin head 31 comprises a wider outer diameter than the rest of the clevis pin 30. From the pin head 31 to the pin tip 32, the clevis 30 comprises an outer diameter that is substantially constant. The length of the clevis pin 30 may correspond to the thickness of two clevis arms 14 of the clevis 13 plus the width of the engaging element 24.

Each clevis 13 comprises the two clevis arms 14 that form a receiving space for the engaging element 24 between themselves. Each clevis arm 14 comprises a clevis hole provided as a through-hole through the clevis arm 14. The two clevis holes 15 through the two clevis arms 14 of each clevis 13 are arranged so that their axes are substantially aligned.

The bucket 20 may be mounted to the rotor 10 by entering the two engaging elements 24 of the bucket 20 into the receiving space between the clevis arms 14 of the two clevises 13 at the respective mounting end of the rotor 10. The engaging elements 24 are arranged as far within this clevis 13 as required so that the clevis holes 15 are aligned with the bucket holes 25. As soon as the holes 15 and 25 are aligned, the two clevis pins 30 are entered through the clevis hole 15 of the two outer clevis arms 14 with their respective pin tips 32 first. Therein, the outer clevis arms 14 correspond to the clevis arms 14 spaced further apart from the receiving section 22 of the bucket 20 than the other two clevis arms 14, namely the two inner clevis arms 14. The clevis pins may be pushed further towards the receiving section 22 of the bucket 20 so that they protrude through the bucket holes 25 and into the respective inner clevis arms 14. At this mounted position, the end of clevis pins, namely the pin tips 32, may rest within the clevis holes 15 of the respective inner clevis arms 14.

After mounting of the bucket 20, the bucket 20 is pivotable about a pivot axis P identified by a dashed line in FIG. 2. The pivot axis P is aligned substantially horizontally and remains in a substantially horizontal plane even when the rotor 10 is rotating about the rotation axis R (see FIG. 1). The bucket 20 is pivotable about the pivot axis P from the hanging position shown in FIG. 2 (when the swinging bucket centrifuge 1 is in its resting position) in its operating position shown in FIG. 1 (wherein the swinging buckets centrifuge 1 is rotating) and back. The two clevis pins 30 of the same mounting end of the rotor 10 are aligned with the pivot axis P. In the shown embodiments, the pin tips 32 point towards each other in a direction towards the receiving section 22 of the bucket they are pivotably fixing to the rotor 10.

To reduce friction and to enable an easy pivot movement of the bucket 20, each clevis pin 30 is held within two clevis arms 14 arranged at both ends of the bucket hole 25. Thus, the strain on the clevis pin 30 is substantially evenly distributed at its two ends. Furthermore, each bucket 20 is mounted to the two devises 13 of the mounting end of the rotor 10. This further reduces the strain on each of the four clevis arms 14 and on each of the two clevis pins 30.

In the mounting position, the pin tip 32 may be arranged so that it does not protrude past and/or out of the inner clevis arm 14. Thus, free access into the receiving section 22 of the bucket may be provided. Furthermore, the engaging elements 24 of the bucket may be shifted outwards away from the receiving section 22. They may be shifted outwards (along the pivot axis P) for a length that corresponds to width (along the pivot axis P) of the inner clevis arm 14. Thus, the even the inner clevis arms 14 may be arranged so that they allow free access into the receiving section 22 of the bucket.

Each clevis pin 30 is held in its designated position within the clevis holes 15 by the retainer 40. The retainer 40 may comprise a retainer arm 41 and at least one, preferably at least two retainer bolts 42. The retainer arm 41 is fixed to the clevis 13 and/or the rotor 10 by the clevis bolts 42 inserted through the retainer arm and into the rotor 10. The retainer bolts 42 may be provided as retainer screws. The retainer arm 41 is arranged so that it prevents removal of the clevis pin 30 out of the clevis holes 15. The retainer arm 41 may be arranged at the pin head 31, e.g. in close vicinity of the pin head 31 and at the side of the pin head 31 that is opposite to the pin tip 32. Thus, the retainer 40 may prevent removal of the clevis pin 30 along the pivot axis P.

After the bucket 20 is, thus, mounted and secured to the mounting end of the rotor 10, the axis of the two clevis pins 30, the axis of all clevis holes 15 and the axis of both bucket holes 25 are aligned along the pivot axis P enabling the swinging movement of the bucket 20.

FIG. 3 shows a cross section through the clevis mounting of the bucket 20 of the swinging bucket centrifuge 1 in the resting position. The plane of the cross section is arranged substantially parallel to the extension of the two clevis arms 14 at the middle of the clevis 13. The cross section cuts through the pin 30, in particular through a middle section of the pin 30, in a plane substantially orthogonal to the pivot axis P.

As shown in FIG. 3, the bucket hole 25 comprises an elongated cross section. Thus, the cross section of the bucket hole 25 is not provided substantially circular but substantially ellipsoid. This reduces the total weight of the engaging elements 24 and, thus, the bucket 20. Thus, the strain on the centrifuge 1 may be reduced. Furthermore, the elongated cross section of the bucket hole 25 may enable a movement of the bucket 20 in the resting position.

At the side of the engaging element 24 that is facing the center of the swinging bucket centrifuge 1, namely the axis of rotation R, the engaging element comprises an abutting side 26. The abutting side 26 may, e.g., be arranged at a predetermined angle to the vertical axis in the resting position. The abutting side 27 of the engaging element 24 may abut a resting side 16 of the rotor 10. The resting side 16 may be provided by the clevis 13, in particular in the middle and within the clevis 13. The resting side 16 may be provided at an angle towards the vertical in the resting position that corresponds to the angle of the abutting side 26. The resting side 16 and/or the abutting side 26 may define the hanging position of the bucket 20 in the resting position of the swinging buckets centrifuge 1. The resting side 16 and the abutting side 26 may be arranged so that they define the resting position of the bucket 20, e.g. so that the bottom 21 is arranged substantially horizontally in its hanging position.

FIGS. 4A and 4B show a perspective view of two different retainer rings 43 and 44. The retainer rings 43 and/or 44 may be part of another kind of retainer than the retainer shown in FIGS. 1, 2, and 3. The alternative embodiment of the retainer 40' is shown in FIG. 5. The retainer rings may be provided from metal and/or may comprise an opening allowing a slight deformation of the retainer ring.

FIG. 5 shows a perspective view of a detail of a retainer 40' of a swinging bucket centrifuge 1 in an operating position of the centrifuge 1.

The retainer 40' comprises the retainer ring 43 (or, alternatively, the retainer ring 44) and a retainer stop 45.

The retainer ring 43 is arranged around the pin body of the clevis pin 30, between the pin tip 32 of the clevis pin 30 and the outer end of the clevis arm 14. The retainer ring 43 may be arranged between the pin head 31 and the rotor 10. The outer diameter of the retainer ring 43 extends beyond the outer diameter of the pin head 31 in an axial direction away from the pivot axis P (see FIG. 2).

The retainer stop 45 may be provided as substantially solid, L-shaped arm. The retainer stop 45 may be fixed to the rotor 10 at a first end, in particular to the outer clevis arm 14, and/or may comprise a second end that is shaped substantially complementary to the pin head 31. The retainer stop 45 is shaped so that it allows insertion of the clevis pin 30 into the clevis holes 15, thereby allowing even the pin head 31 to pass the retainer stop 45. The retainer ring 43 may comprise a wider outer diameter than the pin head 31 in a radial direction facing away from the respective pivot axis P. In particular, the retainer ring 43 and/or 44 may comprise an outer diameter that interacts with the retainer stop 45 so that it prevents removal of the clevis pin 30 out of its mounting position. Thus, the retainer 40' also prevents removal of the clevis pin 30. The retainer rings 43 and/or 44 may comprise an inner diameter corresponding to the outer diameter of the pin 30. However, the inner diameter of the retainer rings 43 and/or 44 may be slightly smaller than the outer diameter of the pin so that the retainer rings 43 and of 44 clamp tightly on the clevis pin 30.

The figures show the two embodiments of the retainer 40 and the retainer 40'. Instead of these shown retainers 40 and 40', an alternative retainer may be used and/or the pin 30 may be provided as a sex bolt to fix the pin in its mounting position. However, to enable free access into the receiving section 22 of the bucket 20, the pin 30 preferably comprises only a single widened end, namely the pin tip 31.

The rotor 10 incorporates the clevis joint design which diverges from the previously known cantilever design. The clevis joint design places the bucket load in the middle of the clevis pin 30 rather than on one end. Thus, the bending force at the clevis pin is reduced by providing more even contact surfaces. Thus, a peak contacting stress may be reduced between the parts that show wear.

The rotor 10 may be provided as yoke of the swinging bucket centrifuge 1. The clevis arms 14 may be provided as ears of the yoke. To strengthen the clevises 13, the clevis arms 14 and the angle at which the engaging element 24 protrudes from the walls 23 are arranged for enabling a minimal spread of the clevis arms 14. Further thickening of the engaging elements 24 might extend the distance that the engaging elements 24 are spaced from the center of the bucket load.

In an embodiment, the rotor 10, the bucket 20, and the retainer arm 41 are provided from 17-4PH material. The clevis pin 30 is provided from boronized IN718. The retainer bolts 42 may be provided as M5 bolts, e.g. as 2-70S M5 bolts.

The clevis arms 14 and/or the engaging elements 24 of the buckets 20 may be plated with or without thin dense chrome.

These materials may enable the swinging bucket centrifuge 1 to operate at 4000G without requiring lubrication The clevis pin 30 may be provided from Nitronic 60, Aluminum Bronze, and/or IN718. The retainer bolts 42 may be provided from 304 stainless steel.

In particular, the clevis pin 30 may be provided as NITRONIC 60/UNS S21800/AMS 5848 (annealed). The rotor 10, in particular the clevis arms 14 providing the clevis holes 15, and/or the bucket 20, in particular the engaging elements 24 providing the bucket holes 25, may be provided as ASTM A747 CB7Cu-1 H1025.

The above identified combination of the materials, the pin diameter, the positioning of the bucket's center of gravity relative to the pivot axis P, and the low contact stresses supplied by the clevis joint design may enable the rotor 10 to operate without lubrication for its lifetime while achieving at least an 85° swing-up angle.

Therein, diameter of the clevis pin 30 may dependent upon several parameters, including:
- the mass of the bucket 20 and its content;
- the friction between the clevis hole 15 and the clevis pin 30; and/or
- the distance between the pivot axis P and the center of gravity of the bucket 20 plus its content.

I.E., while a smaller diameter of the clevis pin 30 may improve swinging up the bucket 20, the diameter should be sufficiently large to not break while spinning in a loaded state. A larger diameter may reduce the contact pressure which may reduce the wear of the centrifuge 1. Thus, the diameter of the clevis pin 30 may be calculated to weigh some or all of these parameters.

In an embodiment, the length of the clevis pin 30 along the pivot axis P (without the pin head 31) is from about 100% to about 200% of the outer diameter at the pin tip 32. The outer diameter of the clevis pin 30 is substantially constant from the pin tip 32 to the pin head 31. For example, the outer diameter of the clevis pin 30 at the pin tip 32 may be from about 60% to about 80% of the length of the clevis pin 30 (without the pin head 31).

LIST OF REFERENCE NUMERALS

1 swinging bucket centrifuge
10 rotor
11 center
12 center hole
13 mounting end
14 clevis arm
15 clevis hole
16 resting side
17 bucket
21 bottom
22 receiving section
23 wall
24 engaging element
25 bucket hole
26 abutting side
30 clevis pin
31 pin head
32 pin tip
40 retainer
40' retainer
41 retainer arm
42 retainer bolt
43 retainer ring
44 retainer ring
45 retainer stop
P pivot axis
R axis of rotation

The invention claimed is:

1. A swinging bucket centrifuge comprising:
a rotor comprising at least one mounting end, and
at least one bucket mounted to the at least one mounting end of the rotor,
wherein the at least one bucket is mounted to the at least one mounting end of the rotor by at least one clevis pin held in at least one clevis so that the at least one bucket is pivotable about the at least one clevis pin between a resting position and an operational position, wherein a swing-up angle of the at least one bucket from the resting position to the operational position is at least 80 degrees,
wherein a first of the at least one mounting end and the at least one bucket comprises the at least one clevis and a second of the at least one mounting end and the at least one bucket comprises an engaging element comprising an engaging element through-hole, wherein the engaging element is arranged between two clevis arms of the at least one clevis,
wherein each of said two clevis arms comprises a clevis arm through-hole,
wherein the at least one clevis pin is arranged within the two clevis arm through-holes and within the engaging element through hole, and
wherein the engaging element, the two clevis arms, and the at least one clevis pin are configured for swinging up of the at least one bucket from the resting position to the operational position to the swing-up angle of at least 80 degrees for a wear life of at least 200,000 cycles of the rotor without requiring a lubricant.

2. The swinging bucket centrifuge according to claim 1, wherein the engaging element through-hole or each of the clevis arm through-holes that are located on the at least one bucket comprises an elongated cross section extending in a vertical direction when the at least one bucket is in the resting position.

3. The swinging bucket centrifuge according to claim 1, wherein the at least one clevis is part of the at least one mounting end of the rotor and the at least one bucket comprises the engaging element arranged between the two clevis arms of the at least one clevis.

4. The swinging bucket centrifuge according to claim 1, wherein the at least one mounting end of the rotor comprises the engaging element arranged between the two clevis arms of the at least one clevis, which is part of the at least one bucket.

5. The swinging bucket centrifuge according to claim 1, wherein the at least one bucket comprises two buckets, wherein the at least one mounting end comprises a first mounting end and a second mounting end, wherein the at least one clevis pin comprises a first clevis pin and a second clevis pin, and wherein the at least one clevis comprises a first clevis and a second clevis, wherein the two buckets are arranged at, with respect to an axis of rotation, opposite ends of the rotor, and wherein a first of the two buckets is mounted to the first mounting end of the rotor by the first clevis pin held in the first clevis and a second of the two buckets is mounted to the second mounting end of the rotor by the second clevis pin held in the second clevis so that the first of the two buckets is pivotable about the first clevis pin and the second of the two buckets is pivotable about the second clevis pin.

6. The swinging bucket centrifuge according to claim 1, wherein the at least one clevis pin is held in an operating position by a retainer.

7. The swinging bucket centrifuge according to claim 1, wherein the at least one clevis pin is implemented as a sex bolt pin.

8. The swinging bucket centrifuge according to claim 1, wherein one of the following is provided from Nitronic 60 material and the other one is provided from 17-4PH type stainless steel:
the at least one clevis pin;
the clevis arms and/or the engaging element.

9. The swinging bucket centrifuge according to claim 1, wherein the at least one mounting end of the rotor and a mounting portion of the at least one bucket are arranged and provided so that an opening into an inside of the at least one bucket is unblocked when the at least one bucket is in the resting position.

10. The swinging bucket centrifuge according to claim 1, wherein an abutting side of the at least one bucket abuts a resting side of the rotor when the at least one bucket is in the resting position.

11. The swinging bucket centrifuge according to claim 1, wherein the swing-up angle of the at least one bucket from the resting position to the operational position is at least 85 degrees, and
wherein the engaging element, the two clevis arms, and the at least one clevis pin are configured for the swinging up of the at least one bucket to the swing-up angle of at least 85 degrees for the wear life of at least 200,000 cycles of the rotor without requiring lubricant.

12. The swinging bucket centrifuge according to claim 1, wherein the at least one clevis pin comprises two clevis pins, wherein the at least one bucket is mounted to the at least one mounting end of the rotor by the two clevis pins, wherein each of the two clevis pins are held in the at least one clevis, and wherein the two clevis pins are aligned along a pivot axis of the at least one bucket.

13. The swinging bucket centrifuge according to claim 1, wherein the rotor is adapted to apply an acceleration of 4000G, and
wherein the engaging element, the two clevis arms, and the at least one clevis pin are configured for the swinging up of the at least one bucket to the swing-up angle of at least 80 degrees for the wear life of at least 200,000 cycles of the rotor at the acceleration of 4000G without requiring lubricant.

14. A method of providing a swinging bucket centrifuge comprises the steps of:
providing a rotor comprising at least one mounting end, and
mounting at least one bucket to the at least one mounting end of the rotor,
wherein the at least one bucket is mounted to the at least one mounting end of the rotor by at least one clevis pin held in at least one clevis so that the at least one bucket is pivotable about the at least one clevis pin between a resting position and an operational position, wherein a swing-up angle of the at least one bucket from the resting position to the operational position is at least 80 degrees,
wherein a first of the at least one mounting end and the at least one bucket comprises the at least one clevis and a second of the at least one mounting end and the at least one bucket comprises an engaging element comprising an engaging element through-hole, wherein the engaging element is arranged between two clevis arms of the at least one clevis,
wherein each of said two clevis arms comprises a clevis arm through-hole,
wherein the at least one clevis pin is arranged within the two clevis arm through-holes and within the engaging element through hole, and
wherein the engaging element, the two clevis arms, and the at least one clevis pin are configured for swinging up of the at least one bucket from the resting position to the operational position to the swing-up angle of at least 80 degrees for a wear life of at least 200,000 cycles of the rotor without a lubricant.

15. The method according to claim 14, wherein the engaging element through-hole or each of the clevis arm through-holes that are located on the at least one bucket comprises an elongated cross section extending in a vertical direction when the at least one bucket is in the resting position.

16. The method according to claim 14, wherein the at least one clevis is part of the at least one mounting end of the rotor and the at least one bucket comprises the engaging element arranged between the two clevis arms of the at least one clevis.

17. The method according to claim 14, wherein the at least one mounting end of the rotor comprises the engaging element arranged between the two clevis arms of the at least one clevis, which is part of the at least one bucket.

18. The method according to claim 14, wherein one of the following is provided from Nitronic 60 material and the other one is provided from 17-4PH type stainless steel:
the at least one clevis pin;
the clevis arms and/or the engaging element.

19. The method according to claim 14, wherein the swing-up angle of the at least one bucket from the resting position to the operational position is at least 85 degrees, and
wherein the engaging element, the two clevis arms, and the at least one clevis pin are configured for the swinging up of the at least one bucket to the swing-up angle of at least 85 degrees for the wear life of at least 200,000 cycles of the rotor without requiring lubricant.

20. The method according to claim 14, wherein the rotor is adapted to apply an acceleration of 4000G, and
wherein the engaging element, the two clevis arms, and the at least one clevis pin are configured for the swinging up of the at least one bucket to the swing-up angle of at least 80 degrees for the wear life of at least 200,000 cycles of the rotor at the acceleration of 4000G without requiring lubricant.

* * * * *